United States Patent

Kamata

[11] Patent Number: 6,137,598
[45] Date of Patent: Oct. 24, 2000

[54] IMAGE RECORDING APPARATUS AND TRANSMISSION METHOD USING THE SAME

[75] Inventor: Masanori Kamata, Chiba, Japan

[73] Assignee: Mitsushita Graphic Communication Systems, Inc., Tokyo, Japan

[21] Appl. No.: 09/049,144

[22] Filed: Mar. 27, 1998

[30] Foreign Application Priority Data

Apr. 18, 1997 [JP] Japan .................................. 9-116470

[51] Int. Cl.⁷ .................................................. H04N 1/00
[52] U.S. Cl. ................... 358/437; 358/468; 379/100.15; 399/85; 399/87
[58] Field of Search ................................... 358/468, 434, 358/437; 379/100.01, 100.15; 399/82, 85, 87

[56] References Cited

U.S. PATENT DOCUMENTS

| | | | |
|---|---|---|---|
| 5,070,467 | 12/1991 | Todome | 395/166 |
| 5,357,350 | 10/1994 | Matsunai | 358/468 |
| 5,748,337 | 5/1998 | Minamizawa | 358/468 |
| 5,778,163 | 7/1998 | Terajima | 395/113 |

FOREIGN PATENT DOCUMENTS

| | | |
|---|---|---|
| 0290963 | 11/1988 | European Pat. Off. . |
| 0656721 | 6/1995 | European Pat. Off. . |

*Primary Examiner*—Kimberly A. Williams
*Assistant Examiner*—Derrick Fields
*Attorney, Agent, or Firm*—Greenblum & Bernstein, P.L.C.

[57] ABSTRACT

An image recording apparatus according the present invention includes a copy section for copying an original, a transmission section for transmitting the original via a telephone line, an input section for inputting the number of sheets to be copied and a destination telephone number, a determination section for determining a desired mode based on the input numerical values, and an execution stop section for stopping the execution of a mode other than the desired mode. In addition, in a transmission method according to the present invention, data input during a copy mode is retained in an image recording apparatus with a facsimile and a copy functions, the mode is switched to a facsimile mode with the input data retained, and the input data is used to execute facsimile transmission.

10 Claims, 3 Drawing Sheets

IMAGE RECORDING APPARATUS AND TRANSMISSION METHOD USING THE SAME

BACKGROUND OF THE INVENTION

1. Field of the Invention

The present invention relates to an image recording apparatus with a copy function and a facsimile transmission function as well as a transmission method using this apparatus.

2. Description of the Related Art

In recent years, image recording apparatuses with a copy function and a facsimile transmission function have been spreading. In these image recording apparatuses, the same console panel is used to input data in both copy and facsimile modes. Thus, such an image recording apparatus has a function for switching between the copy mode and the facsimile mode.

In one example of such a mode switching function, when a facsimile transmission number is input in the copy mode, "0", which is the first digit of the facsimile transmission number, is input to automatically switch the mode, and when the number of sheets to be copied is input in the facsimile mode, an alarm is issued indicating that the entry does not meet the number of digits required for a facsimile transmission number before the mode is switched.

In this mode switching function, in the case that a facsimile transmission number is input in the copy mode, the first digit of the facsimile transmission number may be, for example,"7" instead of "0", and useless copying is executed during the copy mode without automatically switching to the facsimile mode.

In addition, even if "0" is input to switch from the copy mode to the facsimile mode, the mode is switched to reset the entry of "0" so a new entry starting with "0" need to provide in the facsimile mode.

In addition, in this switching function, when the number of sheets to be copied is input in the facsimile mode and if the operator starts the operation without noticing the alarm display, a call is made with the mistaken transmission number. The operator does not notice that the apparatus is in a different mode until the erroneous call has been actually made, so the above operation is fruitless.

SUMMARY OF THE INVENTION

It is an object of this invention to provide an image recording apparatus and a transmission method using this apparatus that can prevent useless operations even when the operator makes an entry during a mode other than a desired one.

This object is achieved by an image recording apparatus comprising copy means for copying an original; transmission means for transmitting the original via a telephone line; input means for inputting the number of sheets to be copied and a destination telephone number; determination means for determining a desired mode based on the input numerical values; and execution stop means for stopping the execution of a mode other than the desired mode.

Since this configuration stops the execution of a mode other than the desired mode, useless operations caused by the operator's erroneous entries can be prevented. Consequently, the wasteful use of recording paper can be avoided.

The image recording apparatus according to this invention allows the determination means to make determinations using as a threshold value a numerical value smaller than the number of digits in a destination telephone number. In this case, since a number smaller than the number of digits in a telephone number is used as the threshold value, it can be reliably determined whether the operator's entry indicates a sheets number setting for copying or a telephone number for facsimile transmission.

In addition, when a particular entry is made, the image recording apparatus according to this invention retains a value input during a mode other than a desired mode. When the mode is then switched to the desired one, it uses the input value to execute the desired mode. In this case, since the value input during a mode other than the desired mode is retained, the entry made during a mode other than the desired mode prior to switching can be used to execute the desired mode. As a result, the entry made during a mode other than the desired mode can be used as it is, thereby eliminating the need for reentries.

DETAILED DESCRIPTION OF THE PREFERRED EMBODIMENT

An embodiment of this invention is specifically described below with reference to the drawings.

Figure 1:
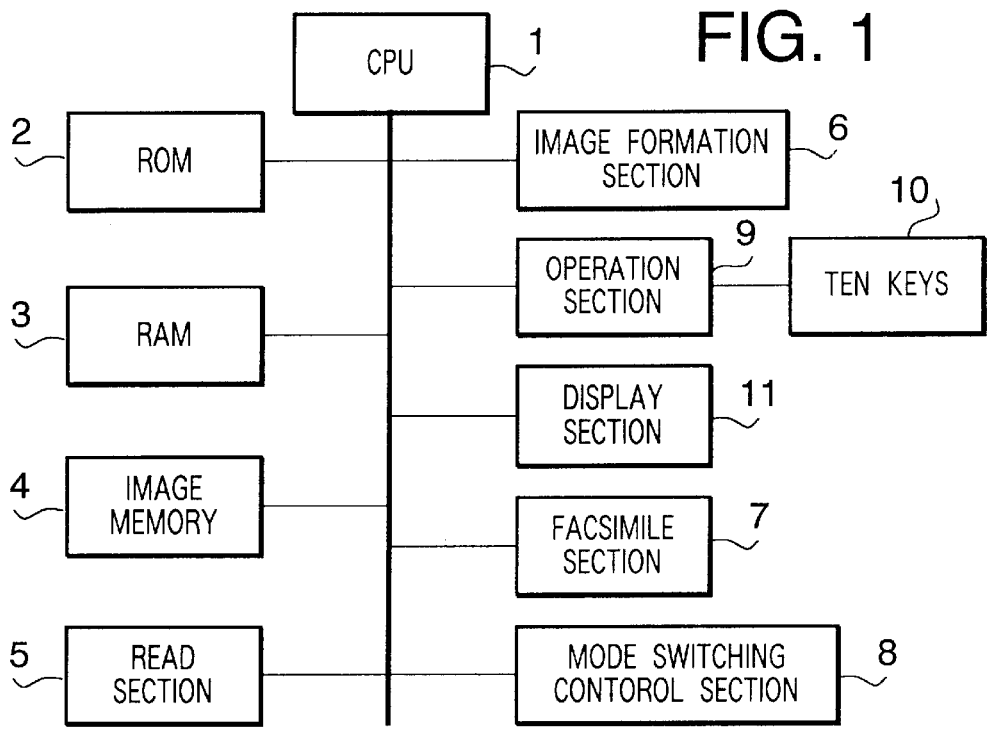
FIG. 1 is a block diagram showing an approximate configuration of an image recording apparatus according to this invention.

FIG. 1 is a block diagram showing an approximate configuration of an image recording apparatus according to this invention. In the image recording apparatus shown in FIG. 1, a CPU 1 is control section for controlling the entire apparatus. A ROM 2 is a memory in which data required to operate the apparatus is stored. A RAM 3 is a memory in which numerical data, the number of sheets to be copied, and a facsimile destination telephone number input from an operation section are stored. Furthermore, an image memory 4 stores read image data.

A read section 5 reads images from an original and transmits them to the image memory 4 as image data. An image formation section 6 is an unit of irradiating the light to photographic drum to convert the image data into latent images, transferring the latent images to recording paper by using a toner, and fixing the images to recording paper. The image formation section 6 also prints on recording paper facsimile data transferred to a facsimile section 7 via a telephone line.

In addition, a mode switching control section 8 controls switching between a copy mode and a facsimile mode. An operation section 9 comprises an input portion such as ten keys 10 to perform various operational entries. Furthermore, a display section 11 displays numerical data and a mode input from the operation section 9.

Figure 2:
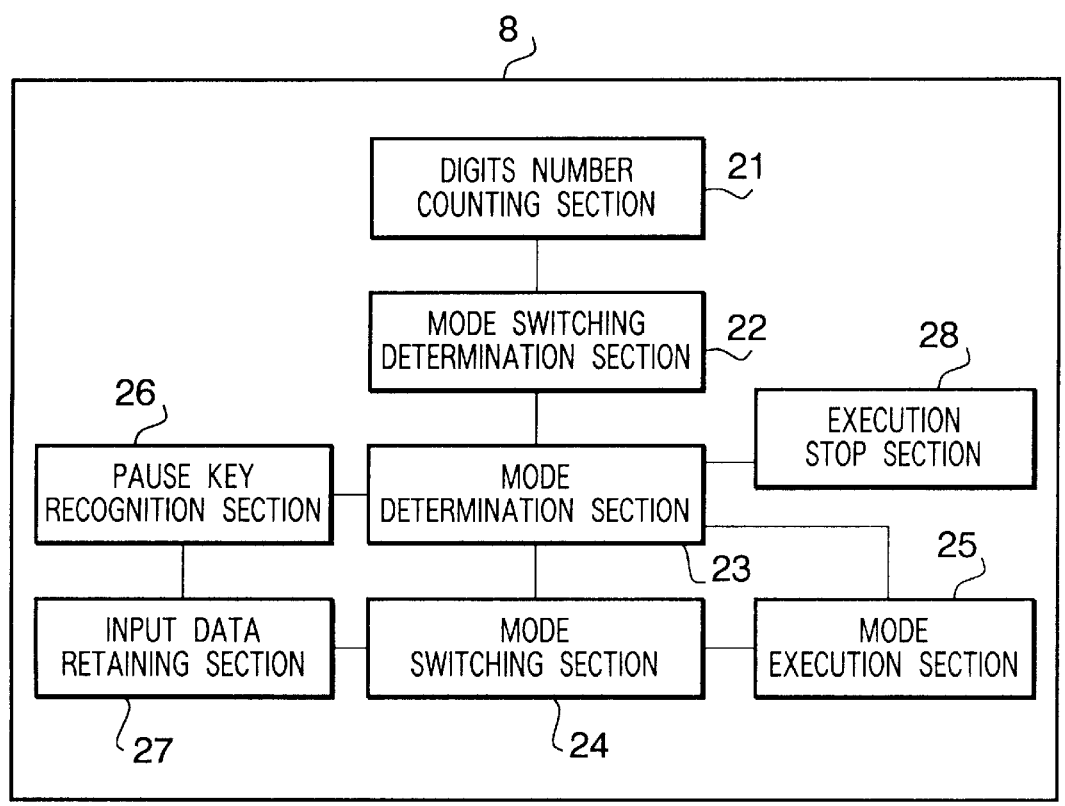
FIG. 2 illustrates a mode switching control section in the image recording apparatus according to this invention.

Specifically, the mode switching control section 8 is configured as shown in FIG. 2. That is, the mode switching control section 8 is mainly composed of a digits number counting section 21 for counting the number of digits in numerical data input from the operation section 9; a mode switching determination section 22 for determining based on the counted number of digits whether or not to switch a mode; a mode determination section 23 for determining what the current mode is; a mode switching section 24 for switching a mode; a mode execution section 25 for executing a mode; a pause key recognition section 26 for determining whether or not a pause key has been entered; an input data retaining section 27 for retaining input data when the pause key has been input; and an execution stop section 28 for stopping the execution of a mode different from a desired mode when a start key has been entered during the first mode. The digits number counting section 21 and mode switching determination section 22 determine a mode.

In the image recording apparatus of the above configuration, the digits number counting section 21 counts an input value and the mode switching determination section 22 determines whether or not the number of digits in the input value exceeds a threshold value in order to determine whether or not to switch the mode. Furthermore, the mode determination section 23 determines the current mode. Based on these information, if the current mode is different from a desired one, the execution stop section 28 stops the execution of the first mode. This can prevent useless operations caused by the operator's erroneous entries to avoid the wasteful use of recording paper.

For example, to determine whether or not to switch the mode, the digits number counting section 21 counts the number of digits in a destination telephone number and the mode switching determination section 22 uses as a threshold value a numerical value smaller than the number of digits in the destination telephone number. For example, the threshold value for input digits is set at two to allow only two digits to be displayed. In this case, even if an entry is made three times, only two digits are displayed with only the input order of the digits changed. It can thus be reliably determined whether the operator's entry indicates a sheets number setting for copying or a telephone number for facsimile transmission.

In addition, whether or not a particular entry, that is, an entry of the pause key has been made is determined by the pause key recognition section 26. The input data retaining section 27 then retains a value input during a mode other than the desired mode. When the mode switching section 24 subsequently switches the mode to the desired one, the mode execution section 25 executes the desired mode using the retained input value.

Thus, t he entry made during a mode different from the desired mode prior to switching can be used to execute the desired mode. Consequently, the entry made during a mode other than the desired mode can be used as it is, thereby eliminating the need for reentries.

For example, data input during the copy mode is retained, the mode is switched to the facsimile mode with the input data retained, and the input data is then used to carry out facsimile transmission. Thus, even if a facsimile transmission number is mistakenly input during the copy mode, it can be used as it is without reentering that telephone number after the mode is switched. In addition, even if the first digit of the facsimile transmission number is not "0", a useless copying operation and thus the wasteful use of recording paper can be prevented.

Figure 3:
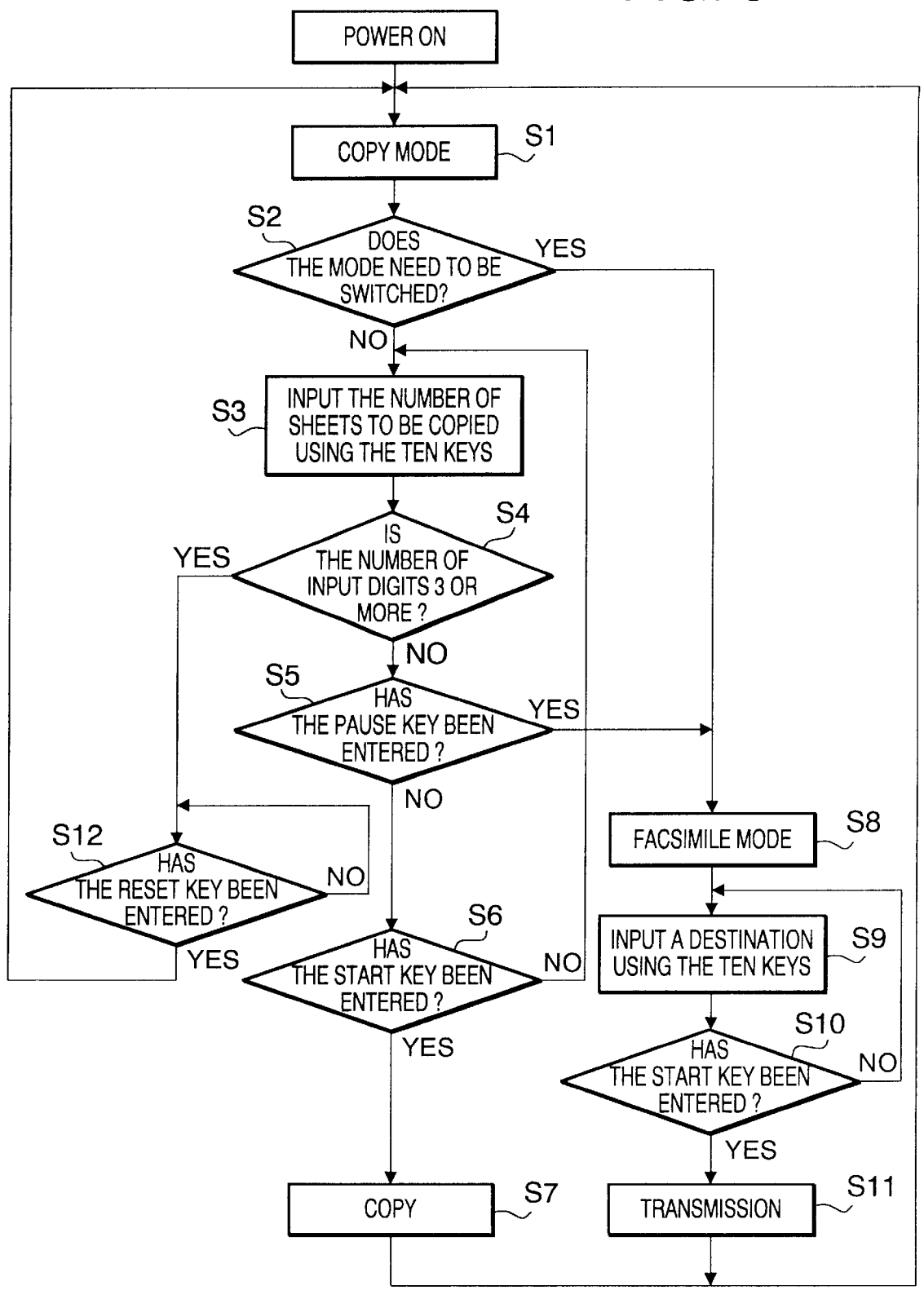
FIG. 3 is a flowchart illustrating an operation of the image recording apparatus according to this invention.

Next, an operation of the image recording apparatus of the above configuration is explained with reference to the flowchart in FIG. 3. In this example, the power has been turned on (standby state), the copy mode has been entered (S1), and the threshold value for input digits is two. The facsimile and copy modes can be switched as required by entering a facsimile key 33 and a copy key 34.

Figure 4:
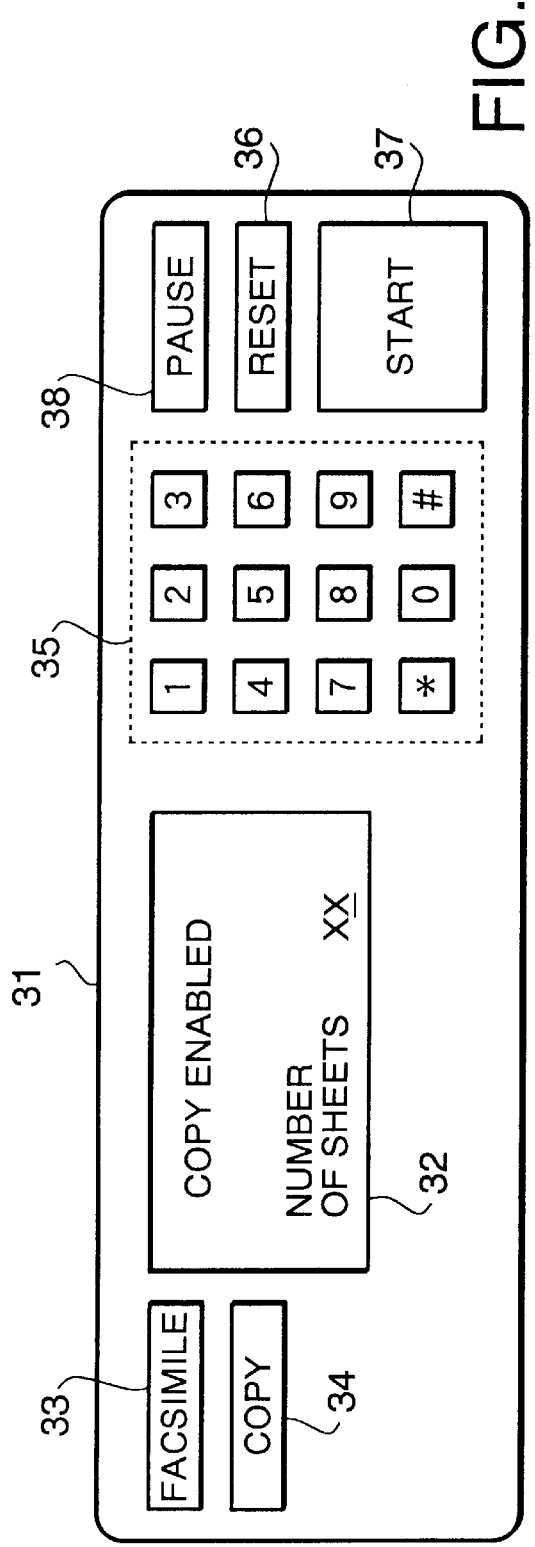
FIG. 4 shows a display section during a copy mode in the image recording apparatus according to this invention.
Figure 5:
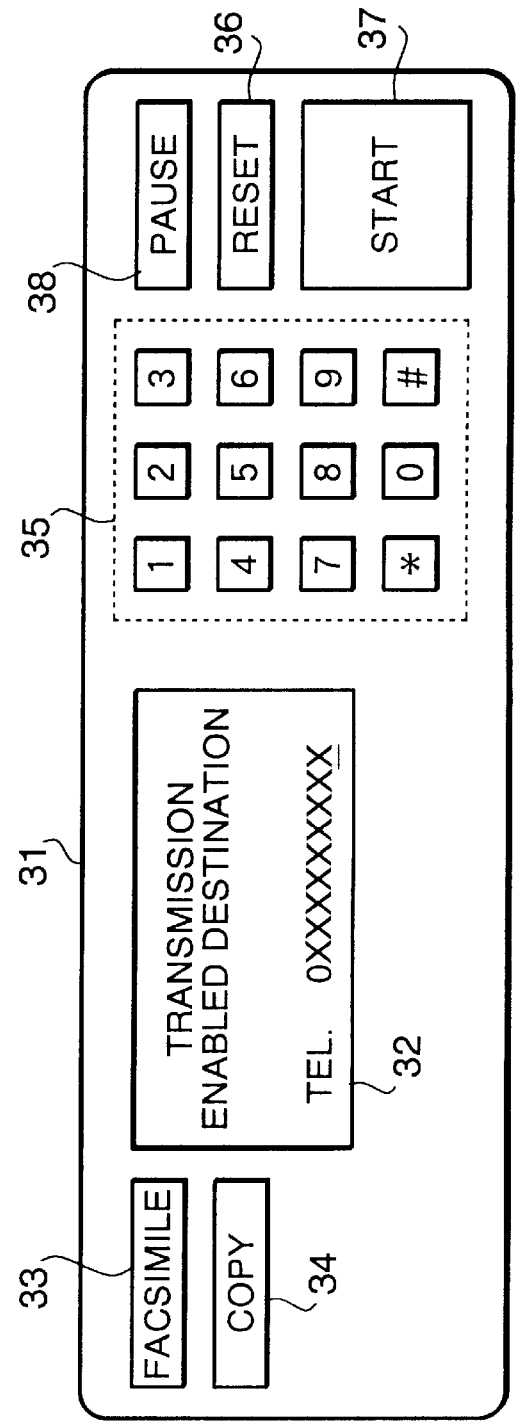
FIG. 5 shows the display section during a facsimile mode in the image recording apparatus according to this invention.

First, the copying of an original is described. With the power turned on, "copy enabled" is displayed in a display section 32 on a console panel 31, as shown in FIG. 4. Then, the process determines whether or not the mode needs to be switched (S2). In this case, the mode does not need to be switched, so the number of sheets to be copied is input using the ten keys 35 (S3). The process then determines whether or not the entry exceeds the threshold value, that is, whether or not it includes three digits or more (S4).

If the entry includes less than three digits, the process determines whether or not a pause key 38 has been entered (S5). If not, then the process determines whether or not a start key 37 has been entered (S6). If so, an input number of sheets are copied (S7).

On the other hand, since two, which is smaller than the number of digits in a facsimile transmission number, is used as the threshold value, if three or more digits are input and the start key 37 is entered during the copy mode, the execution of the mode is stopped to prevent copying and the display section 32 shows "Enter correct number. Press reset key". In this case, if a reset key 36 is entered, the operator starts all over again (S12).

Next, the transmission of an original is described. Since the apparatus is in the copy mode during the standby state, the facsimile key 33 is entered to switch to the facsimile mode. At this point, the display section 32 shows "transmission enabled" (S8). A destination telephone number is input using the ten keys 35 (S9). Is determined whether or not the start key 37 has been entered (S10). If so, the original is transmitted to the input destination telephone number (S11).

If the operator mistakenly inputs the destination telephone number during the copy mode, is determined whether or not the pause key 38 has been entered (S5). If so, the mode is switched to the facsimile mode with the input numerical value retained (S8). Those digits of the destination telephone number which are other than those input during the copy mode are input (S9). Is finally determined whether or not the start key 37 has been entered (S10). If so, the original is transmitted to the input destination telephone number (S11).

The above embodiment has been described in conjunction with the case in which the power has been turned on (standby state)with the copy mode entered, this invention is also applicable to the case in which the power is turned on in the facsimile mode.

Although the above embodiment has been described in conjunction with the case in which the threshold value for input digits is two, the input threshold value is not particularly limited, provided that it is smaller than the number of digits in a destination telephone number.

Although the above embodiment has been described in conjunction with the use of the pause key as the particular key entered to retain input data, this invention allows another key to be used to retain input data.

As described above, the image recording apparatus according to this invention stops the execution of a mode other than a desired mode, so useless operations caused by the operator's erroneous entries can be prevented. Consequently, the wasteful use of recording paper can be avoided. Since the image recording apparatus according to this invention uses as the threshold value a numerical value smaller than the number of digits in a telephone number, it can be reliably determined whether the operator's entry indicates a sheets number setting for copying or a telephone number for facsimile transmission.

In addition, the image recording apparatus according to this invention retains a value input during a mode other than a desired mode, so the entry made during a mode other than the desired mode prior to switching can be used to execute the desired mode. As a result, the entry made during a mode other than the desired mode can be used as it is, thereby eliminating the need for reentries.

In addition, according to the present transmission method, the data input during the copy mode is retained, so even if a facsimile transmission number is mistakenly input during the copy mode, it can be used as it is without reentering the telephone number after the mode is switched.

What is claimed is:

1. An image recording apparatus comprising:
   input means for inputting a number of sheets to be copied and a destination telephone number;
   determination means for determining a mode based on the input numerical value;
   execution stop means for stopping the execution of a current mode when the current mode is determined to be a mode other than an execution mode by said determination means, in order not to start the execution of the current mode when a start key is pressed; and
   message indication means for indicating an error message when said execution stop means does not start the execution of the current mode.

2. The image recording apparatus according to claim 1 wherein, the determination means makes mode determinations using a numerical value smaller than the number of digits in a destination telephone number as a threshold value.

3. The image recording apparatus according to claim 1 wherein the apparatus comprises a copy mode and a facsimile mode.

4. An image recording apparatus comprising:
   input means for inputting a numerical value corresponding to one of a number of sheets to be copied and a destination telephone number; and
   input value retaining means for switching a current mode to an other mode by an actuation of a particular key while retaining a numerical value input by said input means in the current mode, and using said input numerical value in the other mode.

5. The image recording apparatus according to claim 4, wherein the apparatus has a facsimile mode and a copy mode.

6. The image recording apparatus according to claim 4, comprising:
   determination means for determining a mode based on the input numerical value;
   execution stop means for stopping execution of a current mode when the current mode is determined to be a mode other than an execution mode by said determination means, in order to start the execution of the current mode when a start key is actuated.

7. An image recording apparatus comprising:
   mode switching means for switching a mode by actuation of a particular key;
   input value retaining means for retaining a value input in a previous mode prior to switching of a mode by said mode switching means, and
   wherein said apparatus uses the input value retained in said input value retaining means in a switched mode.

8. The image recording apparatus according to claim 7, wherein the apparatus has a facsimile mode and a copy mode.

9. A transmission method in an image recording apparatus comprising a facsimile transmission function and a copy function, said method comprising:
   retaining data input during a copy mode when the copy mode is switched to a facsimile mode by actuation of a mode switching key;
   switching the copy mode to the facsimile mode with the input data retained; and
   using said input data to execute facsimile transmission.

10. The image recording apparatus according to claim 4, comprising:
   determination means for determining a mode based on the input numerical value;
   execution stop means for stopping execution of the current mode when the current mode is determined to be a mode other than an execution mode by said determination means, in order not to start the execution of the current mode when a start key is actuated; and message indication means for indicating an error message when said execution stop means does not start execution of the current mode.

* * * * *

UNITED STATES PATENT AND TRADEMARK OFFICE
CERTIFICATE OF CORRECTION

PATENT NO. : 6,137,598  
DATED : October 24, 2000  
INVENTOR(S) : M. Kamata

It is certified that error appears in the above-identified patent and that said Letters Patent is hereby corrected as shown below:

Title page,
Item [73], Assignee, "Mitsushita" should read -- Matsushita --.

Signed and Sealed this

Twentieth Day of November, 2001

Attest:

*Nicholas P. Godici*

NICHOLAS P. GODICI
*Attesting Officer*   *Acting Director of the United States Patent and Trademark Office*